Feb. 4, 1969

E. S. DOERMAN  3,425,307
APPARATUS FOR CUTTING CONTINUOUS WEBS OF PAPER OR LIKE MATERIAL
Filed March 28, 1966

United States Patent Office 3,425,307
Patented Feb. 4, 1969

3,425,307
APPARATUS FOR CUTTING CONTINUOUS WEBS OF PAPER OR LIKE MATERIAL
Eryk Stefan Doerman, London, England, assignor to Molin Machine Company Limited, London, England, a corporation of Great Britain
Filed Mar. 28, 1966, Ser. No. 537,828
Claims priority, application Great Britain, Mar. 29, 1965, 13,215/65
U.S. Cl. 83—346       8 Claims
Int. Cl. B26d 1/40; B23d 25/02

ABSTRACT OF THE DISCLOSURE

In a cutting device having a rotating cutter head to cut material against a drum surface, the cutter head is mounted on a spherically shaped portion of a shaft by an encircling ring and a cross pin extending through the shaft and the head, the ring being also connected to the head by stub pins at right angles to the cross pin, the arrangement permitting limited universal movement of the head so that the cutters can align themselves with the drum surface.

---

This invention relates to improvements in apparatus for cutting continuous webs of paper or like material and refers more particularly to apparatus in which a cutting element or knife mounted on a rotating carrier is arranged to cut material such as a web of cigarette tipping material against the hard surface of a conveyor such as a drum. Cutting apparatus of this kind is well known, and in such apparatus to enable the cutting element or knife to penetrate the material and make a clean cut it is desirable that it should be yieldingly pressed against the hard surface. When very thin material such as cork tipping material is being cut in this manner the cylinder swept out by the knife during its rotation is ararnged to interfere slightly with the surface of the conveyor, but owing to the yielding mounting of the knife the surface of the conveyor and the knife are not materially affected by the interference. It is further desirable to provide some means for allowing the knife to align itself with the drum surface at the moment of cutting.

According to the present invention there is provided cutting apparatus comprising a rotating cutter head adjacent a conveyor which carries a web of material to be cut, the cutter head having a cutter element to cut the web against the surface of the conveyor, wherein the said cutter head is carried by a rotatable shaft for rotation therewith and is mounted on said shaft for limited universal movement about a point on said shaft, whereby the said cutter head can align itself with the surface of the said conveyor at each cutting operation.

The apparatus may comprise a spherical portion of said shaft, a ring located between said spherical portion and said cutter head, and means connecting said ring to said cutter head and to said spherical portion of the shaft, respectively, while permitting universal rocking movement of said cutter head about said spherical portion. The ring may be connected to the cutter head by diametrically opposite pins, while the ring is connected to the shaft by a pin at right angles to the first said pins. The ring may have a convex outer surface.

The apparatus may include an eccentric support for the shaft whereby the position of the shaft relatively to the said conveyor can be adjusted to determine the amount of interference between the cutter element and the conveyor surface. The apparatus may further include drive means to rotate said shaft, and a flexible coupling between said shaft and said drive means to permit adjustment of the position of the shaft.

Further according to the invention there is provided cutting apparatus comprising a rotating cutter head adjacent a conveyor which carires a web of material to be cut, the cutter head having a plurality of cutter elements to cut the web against the surface of the conveyor, the apparatus including a rotatable shaft by which the cutter head is carried, the head being mounted on said shaft for universal movement about a point on said shaft, drive means to rotate said shaft, and a flexible coupling between said shaft and said drive means.

Still further according to the invention there is provided cutting appaartus comprising a rotating cutter head adjacent a conveyor which carries a web of material to be cut, the cutter head having a plurality of cutter elements to cut the web against the surface of the conveyor, the apparatus including a rotatable shaft by which the cutter head is carried, an eccentric support for said shaft whereby the position of the shaft relatively to the said conveyor surface can be adjusted, drive means to rotate said shaft, and a flexible coupling between said shaft and said drive means.

The invention will be further described with reference to the accompanying drawing in which.

Figure 2:
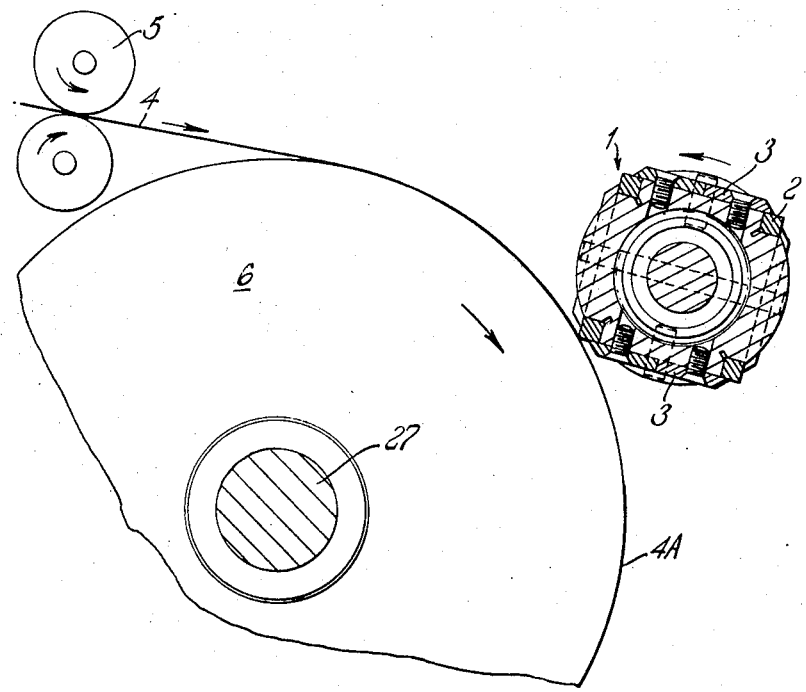
FIGURE 2 is a section of the cutter head taken on the line 2—2, FIGURE 1, and also shows its engagement with a conveyor drum for the web.
Figure 3:
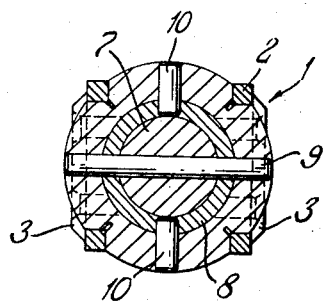
FIGURE 3 is a section on line 3—3, FIGURE 1 showing more clearly the arrangement of pins which couple the ring to the head and the ring to the shaft.

Referring to the drawings a cutter head bearing the general reference 1 has four cutters 2 which are of sharp-edged rectangular section, as can be seen in FIGURE 2 and 3 and these are fixed to the body of the head by clamps 3. A continuous web 4 of tipping material is fed to a drum 6 by means of a pair of feed rollers 5, or the like, and these feed the web rather slower than the peripheral speed of the drum so that the web slips on the drum. The web is held to the drum 6 by suction through holes in the periphery of the drum but these are not shown as the arrangement is well known. When a piece of material is cut from the web it immediately moves at the speed of the drum so it becomes spaced from the following end of the web, as shown in FIGURE 2, where a cut tip is marked 4A.

The cutter head 1 is supported on a shaft 7 to which is attached a ring 8 by a cross pin 9 and the ring is attached to the body by short stub pins 10 which are at right angles to the cross pin 9. The pin 9 extends through the body, as shown in FIGURE 3 but the holes in the body are larger than the pin to permit relative movement between pin and body. It will be noted that the part of the shaft 7 where the ring is attached is of generally spherical shape so that the ring can swing around the shaft during the universal movement. Also the ring 8 has a convex outer surface to permit the cutter head to swing around the ring. The shaft is rotated by means of a gear wheel 11 which is split on the line 11A so as to take up backlash between the gear and its driving gear (not shown) and the gear is journalled on a shaft 14 which rotates inside a bush 12 fixed to the frame 13. The connection between the shaft 14 and the neighbouring end of the shaft 7 is by means of a flexible coupling, shown as a spring 15, because the position of the shaft is adjusted by an eccentric arrangement which will now be described.

The inner end of the bush 12 is reduced in diameter at 16 and on this reduced part is mounted a part 17 which houses a ball race 18. The part 17 is in the form of a narrow structure or cradle and its other end is mounted in a similar manner on an enlarged head of a support stub 19. A key 20 in the head of 19 fits in a slot in the end of the cradle 17 so as to prevent relative movement. The stub 19 is mounted partly in a bush 21 fixed to the frame 13 and partly in flanged bush 22 mounted inside the bush 21.

The bores in the cradle ends which fit over the reduced part 16 of the bush 12 and the enlarged head of 19 are eccentric to the bores which house the ball races and are thus eccentric to the axis of shaft 7. If then the cradle is rotated relatively to the shaft the axis of the shaft will be displaced, the flexible coupling permitting this movement.

The cradle is rotated in this fashion by rotation of the support stub 19. For this purpose the stub is fixed against rotation relatively to the flanged bush 22 by a key 23 and in this way the stub can be rotated by rotation of the bush 22. To do this a screw 25, which fits in an arcuate slot in the flange of 22, is slackened so that the flanged bush can be rotated. The bush can then be turned by a tommy bar 29 which is housed inside the stub 19. By this means the cutting knives may be brought nearer to or farther from the surface of the drum 6 so as to vary the actual contact between a knife and the drum and, as previously stated, when very thin material is being cut the adjustment is such as to provide a slight interference between the knives and the surface of the drum but this is accommodated for, by a slight flexure of the shaft 7. To enable an operator to adjust the interference and hence the cutting pressure accurately, a small sector like plate 27 is fixed to the bush 21 by a screw 26 and its curved outer face is graduated, while the flange of bush 22 has a datum mark to read against the graduations.

The universal mounting above described gives the cutter head a self-aligning character so that each blade in turn comes into contact with the drum surface along the whole of its length. Since, as above described, the cutter head may rock slightly about the axis of the shaft 7, the holes in the body of the head through which the shaft passes are slightly larger than the diameter of the shaft so as to accommodate but, at the same time, limit this movement, which is however quite small.

Figure 1:
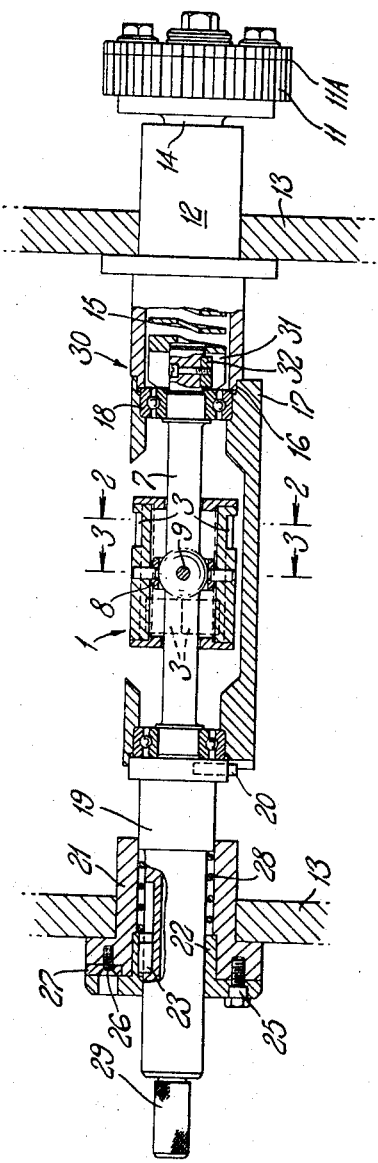
FIGURE 1 is a sectional elevation, partly broken away, of the cutter head shaft and driving arrangements.

In order to detach the cradle and cutter head for servicing the parts the support stub 19 is pulled to the left, FIGURE 1, against the action of a spring 28. The movement is made by means of the tommy bar 29, which may be pulled out and turned at right angles relative to the stub, in which it is retained by pins, so as to provide a cross-member which may be gripped and pulled against the pressure of the spring 28. The movement will pull the enlarged head of 19 out of the eccentric hole in the cradle and the cradle can then be moved off the reduced part 16 in the same way. To permit this the flexible coupling 15 is attached to the end of the spindle 7 by a dog coupling arrangement 30 consisting of a cross-slotted end 31 fixed to the spring and a key 32 fixed to the shaft end which can enter an appropriate slot of the end 31.

If the apparatus is used to cut thicker material it is possible, with relatively weak webs, to partly cut through the web, that is, there is no interference between a cutter and the drum, and the pull exerted on the material by the combined grip of cutter and drum, which at this instant are moving faster than the slowly fed web, is sufficient to effect separation of the partly severed piece which is thereafter carried onwards by the suction through the drum periphery.

What I claim as my invention and desire to secure by Letters Patent is:

1. Cutting apparatus comprising a rotating elongated cutter head adjacent a conveyor which carries a web of material to be cut, the cutter head having a cutter element to cut the web against the surface of he conveyor, wherein the said cutter head is carried by a rotatable shaft for rotation therewith and is mounted on said shaft for limited universal movement about a fixed point located on the axis of said shaft and substantially mid-way along the length of the cutter head, whereby the said cutter head can align itself with the surface of the said conveyor at each cutting operation.

2. Cutting apparatus comprising an elongated rotating cutter head adjacent a conveyor which carries a web of material to be cut, a plurality of cutter elements secured to said cutter head for cutting the web against the surface of the conveyor, a rotatable shaft, and universal mounting means for securing said cutter head substantially mid-way along its length to said rotatable shaft at a fixed point on the axis of said shaft.

3. Cutting apparatus for periodically cutting a web of material carried on a conveyor comprising an elongated rotating cutter head adjacent said conveyor, at least one cutter element secured to said cutter head for cutting the web against the surface of the conveyor, a rotatable shaft, and universal mounting means for securing said cutter head substantially mid-way along its length to said rotatable shaft at a fixed point on the axis of said shaft, whereby said cutter head can align itself with the surface of said conveyor at each cutting operation.

4. Cutting apparatus as claimed in claim 1 wherein said universal mounting means comprises a spherical portion of said shaft, a ring surrounding said spherical portion, and pivotal means connecting said ring to said cutter head and to said spherical portion of the shaft, respectively, permitting universal rocking movement of said cutter head about said spherical portion.

5. Cutting apparatus as claimed in claim 4, wherein said pivotal means connecting said ring to said cutter head comprises diametrically opposite pins and said pivotal means connecting said ring to said shaft comprises a pin at right angles to said diametrically opposite pins.

6. Cutting apparatus as claimed in claim 4 wherein the ring has a convex outer surface.

7. Cutting apparatus as claimed in claim 3, including an eccentric support for the shaft whereby the position of the shaft relatively to said conveyor can be adjusted to determine the amount of interference between the cutter element and the conveyor surface.

8. Cutting apparatus as claimed in claim 7, including drive means to rotate said shaft, and a flexible coupling between said shaft and said drive means to permit adjustment of the position of the shaft relative to said conveyor.

References Cited

UNITED STATES PATENTS

| 3,151,513 | 10/1964 | Rowlands | 83—348 X |
| 1,185,761 | 6/1916 | Bewsic | 83—344 |
| 1,313,325 | 8/1919 | Nordyke et al. | 83—344 X |
| 2,397,603 | 4/1946 | Hackett | 83—344 X |
| 2,762,433 | 9/1956 | Russell | 83—344 X |
| 3,008,366 | 11/1961 | Taylor | 83—346 |
| 3,209,633 | 10/1965 | Doerman | 83—665 X |

FOREIGN PATENTS 1,371,149  7/1964  France.

JAMES M. MEISTER, *Primary Examiner.*

U.S. Cl. X.R.

83—665